United States Patent
Raaf

(10) Patent No.: US 7,146,142 B1
(45) Date of Patent: Dec. 5, 2006

(54) METHOD FOR CONTROLLING THE TRANSMISSION POWER IN A RADIO SYSTEM, AND A CORRESPONDING RADIO SYSTEM

(75) Inventor: Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/019,576

(22) PCT Filed: May 16, 2000

(86) PCT No.: PCT/DE00/01542

§ 371 (c)(1),
(2), (4) Date: Dec. 19, 2001

(87) PCT Pub. No.: WO01/01599

PCT Pub. Date: Jan. 4, 2001

(30) Foreign Application Priority Data

Jun. 23, 1999 (DE) ................................ 199 28 763

(51) Int. Cl.
*H04B 1/06* (2006.01)
(52) U.S. Cl. .................. 455/245.1; 455/13.4; 455/134; 370/318
(58) Field of Classification Search ............. 455/245.1, 455/13.4, 522, 134; 370/318, 321, 329
See application file for complete search history.

(56) References Cited

U.S. PATENT DOCUMENTS 5,457,813 A * 10/1995 Poutanen ..................... 455/70
6,343,218 B1 * 1/2002 Kaneda et al. ............... 455/522
6,744,742 B1 * 6/2004 Koskela et al. ............. 370/318

FOREIGN PATENT DOCUMENTS

| DE | 198 47 678 A1 | 5/1999 |
| EP | 0 923 202 A2 | 6/1999 |
| GB | 2 331 203 | 5/1999 |
| GB | 2 341 294 | 3/2000 |
| HU | 216 370 | 10/1996 |

OTHER PUBLICATIONS

TSG-RAN Working Group 1 meeting #4 Shin-Yokohama (Japan) Apr. 18-20$^{th}$, 1999.

* cited by examiner

*Primary Examiner*—Melur Ramakrishnaiah
(74) *Attorney, Agent, or Firm*—Bell, Boyd & Lloyd LLC

(57) ABSTRACT

In a radio system, the transmission power is controlled by a receiver (1; 2) evaluating the signal from a transmitter (2; 1) and a determining power adjustment information (TPC) as a function of this, and sending this information to the transmitter (2; 1) during successive timeslots (4), in order to control the transmission power. In what is referred to as the slotted mode, the same power adjustment information (TPC) is transmitted to the transmitter (2; 1) in a number of successive timeslots (4) following a section (9) which is not filled with information.

21 Claims, 2 Drawing Sheets

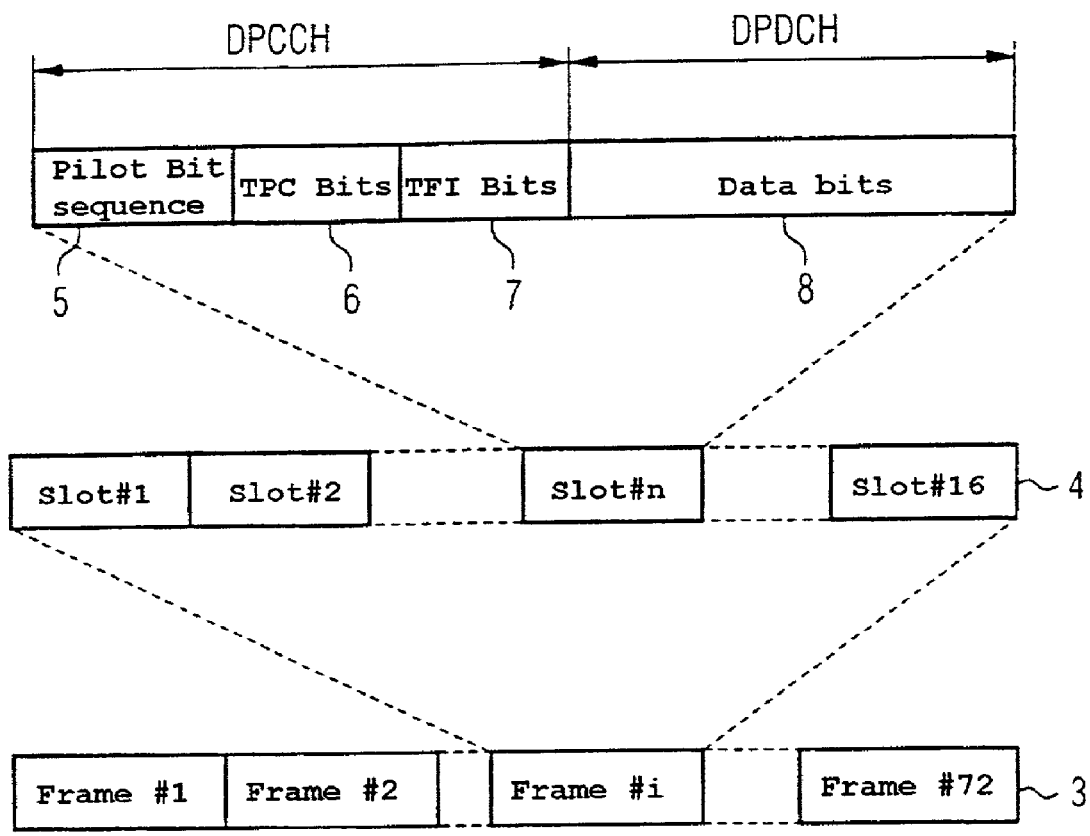
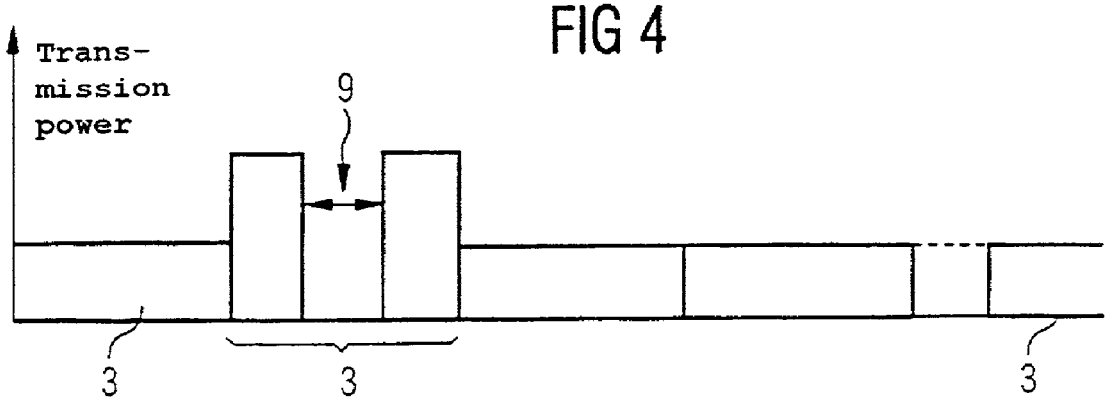

METHOD FOR CONTROLLING THE TRANSMISSION POWER IN A RADIO SYSTEM, AND A CORRESPONDING RADIO SYSTEM

BACKGROUND OF THE INVENTION

Control of the transmission power represents an important performance feature in mobile radio systems in order to suppress possible interference between the individual connections and, thus, to make it possible to improve the capacity and quality of the connections, in order to be able to reduce the mean transmission power and to be able to match it as well as possible to the requirements, as well as to make it possible to compensate, at least partially, for losses in the transmission channels.

For this purpose, the signal transmitted by a transmitter is evaluated at the receiving end in the mobile radio system, in order to make it possible for this to produce information for power control and to transmit this to the transmitter, which then adjusts the transmission power in accordance with the power control or power adjustment information.

In this case, the power adjustment information is transmitted analogously to the transmission of the actual communication information, depending on the respective mobile radio system, embedded in a predetermined frame and timeslot structure; that is to say, the information is transmitted in a number of sequentially transmitted frames, with each frame having a specific number of timeslots. For known mobile radio systems, it has been proposed for the transmitter of the mobile radio system to be operated in a mode which is referred to as the slotted mode or compressed mode, with the information to be transmitted in this case being transmitted within specific frames in compressed form to a receiver in order to make it possible, in the appropriate frame, to produce a section which is free of information bits, and which is referred to as an idle slot, which can then be used for intermediate frequency measurements; for example, in order to prepare for a handover between different mobile radio systems. The information must be transmitted in a shorter time interval for compression.

The principle of compression is illustrated schematically in FIG. 4, with a number of sequentially transmitted frames 3 being shown, each of which has an identical frame duration; for example, 10 ms. The second frame 3 shown in FIG. 4 uses the slotted mode, that is to say the information is transmitted in compressed form in this frame, so that an idle slot 9 occurs in which information is now transmitted. As is likewise shown in FIG. 4, the transmission power can be increased during this frame 3 that is operated in the slotted mode in order to achieve a transmission quality which is not adversely affected by the slotted mode.

However, the slotted mode interrupts the principle of fast power control. In modern mobile radio systems, power adjustment information for the transmitter is produced in each timeslot so that the transmission power can be adapted relatively quickly. However, no such power adjustment information can be transmitted during the idle slots described above. Firstly, this results in a higher error rate for the power adjustment information bits and, secondly, it must be expected that the instantaneous transmission power will deviate to a greater extent from the nominal value.

In order to overcome this problem associated with the slotted mode, it has been proposed, for example, to temporally increase the energy in what are referred to as pilot bits after the slotted mode, for power control, in order to allow correct decoding of the power adjustment information which is generally formed only by a corresponding bit with a specific mathematical sign. The pilot bits are used to estimate the channel impulse response during what is referred to as a training sequence, and they correspond to a known bit pattern. The power control procedure for the slotted mode as described in this document is, however, relatively complicated and requires a relatively large amount of effort.

The present invention is, thus, directed toward an improved method for controlling the transmission power in a radio system, and a corresponding radio system, in which case the aim is to reliably control the transmission power, particularly, in the slotted mode or compressed mode described above.

SUMMARY OF THE INVENTION

The present invention proposes that the same power adjustment information be transmitted in successive timeslots, so that the transmission power in the transmitter can be set with greater reliability, by evaluating the power adjustment information received during these timeslots in combination in order to adjust the transmission power.

The present invention is particularly suitable for use in what is referred to as the slotted mode, in which case the same power adjustment information is transmitted a number of times following an idle slot; that is to say, a section of a frame in which no information is transmitted. However, the present invention is not restricted to this use in the slotted mode and can, in principle, be used also for timeslots which do not follow an idle slot in order to allow more reliable power control in these situations as well. In this case, this approach is of particular interest when the transmission conditions in the respective transmission channel are not changing rapidly (for example, when a mobile station is moving at slow speed).

In particular, the present invention proposes that the signal-to-noise ratio of the received signal be evaluated, for example, after an idle slot, that appropriate power adjustment information be produced as a function of this, and that this information be transmitted to the transmitter during the next two timeslots immediately following the idle slot. The transmitter then evaluates the power adjustment information received during these two timeslots and adjusts the transmission power taking account of both power adjustment information items so that a transmission power adjustment which may have been made on the basis of the first power adjustment information item can still be corrected.

The principle on which the present invention is based can be used both in the uplink, that is to say for transmitting communication information from a mobile station to a base station, and in the downlink, that is to say for the opposite direction, or else for both directions at the same time.

After receiving the power adjustment information in the first timeslot immediately following the idle slot, the transmission power initially can be kept constant so that no change is made until the power adjustment information in the second timeslot has been received.

Generally, the power adjustment information transmitted during each timeslot includes only one bit with the step width for changing the transmission power being coded digitally. However, instead of this, the step width also can be coded in analogue form; that is, the step width then depends, for example, directly analogously on the discrepancy between the received signal level measured in the receiver and a predetermined reference value.

The present invention requires no change whatsoever to the specified timeslot format. The combination of the successively transmitted power adjustment information items results in an improvement in the available bit-signal-noise ratio ($E_b/N_0$). This increased bit-signal-noise ratio allows a greater step width to be provided for power control without any risk of an increased bit error rate more frequently resulting in the transmission power needing to be changed in the wrong direction.

The present invention can be used in various types of radio systems, although it is of particular interest for mobile radio systems using code division multiplexing methods (code division multiple access CDMA).

Additional features and advantages of the present invention are described in, and will be apparent from, the following Detailed Description of the Invention and the Figures.

BRIEF DESCRIPTION OF THE FIGURES

FIG. 3 shows the frame and timeslot structure for what is referred to as a downlink connection, according to the present standard of UMTS Standardization.

FIG. 4 shows an illustration to explain the frame structure in what is referred to as the slotted mode.

DETAILED DESCRIPTION OF THE INVENTION

Figure 2:
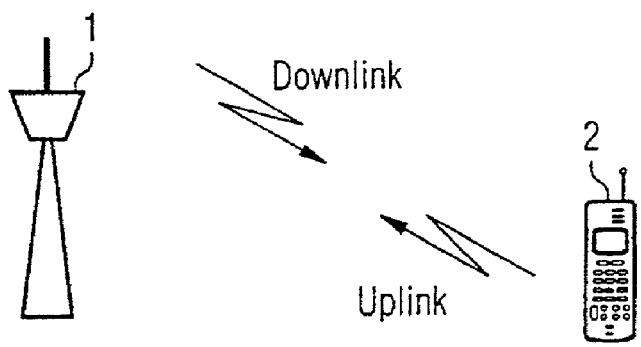
FIG. 2 shows a general schematic illustration to explain the information transmission in a mobile radio system.

The principle of power control will first of all be explained in more detail with reference to FIG. 2. FIG. 2 illustrates the communication between a base station 1 and a mobile station 2 in a mobile radio system. A connection from the base station 1 to the mobile part 2 is referred to as a downlink or forward link, while a connection from the mobile part 2 to the base station 1 is referred to as an uplink or reverse link. For downlink power control, the respective received signal is evaluated in the mobile station 2, and power adjustment information or power control information is produced as a function of it, and is sent back to the base station 1 so that the base station 1 can set the transmission power as appropriate. For uplink control, the received signal is evaluated in the base station 1, where the power control information is produced, and the mobile station 2 is instructed to carry out power adaptation.

The power control information is, in this case, transmitted embedded in a predetermined frame structure depending on the respective mobile radio system.

As an example, FIG. 3 shows the frame and timeslot structure for a downlink connection in a mobile radio system which is operated using a code division multiple access method (CDMA). The frame and timeslot structure shown in FIG. 3 corresponds, in particular, to a UMTS mobile radio channel (Universal Mobile Telecommunications System), which is also referred to as a DPCH (Dedicated Physical CHannel), in accordance with the current state of UMTS Standardization. UMTS is the designation for third-generation mobile radio systems, aiming to provide a worldwide, universal mobile radio standard. According to the UMTS mobile radio standard, the multiple access method is what is referred to as the WCDMA method (Wideband Code Division Multiple Access).

The frame structure shown in FIG. 3 has a duration of 720 ms and includes, in particular, 72 identically constructed frames 3 with a frame duration of 10 ms, with each frame, in turn, having 16 timeslots 4, each with a timeslot duration of 0.625 ms. Alternatively, a frame 3 may also include 15 correspondingly longer timeslots 4. However, the former situation is assumed in the following text. Each timeslot 4 includes information which is split between a logical control channel (DPCCH, Dedicated Physical Control Channel) and a logical data channel (DPDCH, Dedicated Physical Data Channel). The DPCCH section includes a pilot bit sequence 5 and what is referred to as TPC information (Transmitter Power Control) 6 and TFI information (Transmitter Format Identifier) 7. The DPDCH section includes user data bits 8.

The pilot bit sequence 5 is used for estimating the channel impulse response during what is referred to as a training sequence, and corresponds to a known bit pattern. The receiver can determine or estimate the channel impulse response of the mobile radio channel by comparing the received signal with the known pilot bit sequence.

The TFI information 7 is used for format identification for the respective receiver. The TFI bits are protected via their own coding method in accordance with the present WCDMA standard, and are distributed over an entire frame (time period 10 ms) by interleaving. If, for example, the TFI information 7 in each timeslot includes two bits, then this results in a total of 2*16=32 TFI bits per frame, which includes 16 timeslots, and these are coded via what is referred to as a biorthogonal coding method.

The TPC information 6 represents the command, produced by the receiver and transmitted to the transmitter, to adjust the transmission power. For this purpose, the received power or the signal-to-noise ratio of the received signal is compared with a predetermined reference value in the receiver, and the value for the power adjustment command is determined as a function of the discrepancy. As such, if the received power exceeds the reference value, a command is produced to reduce the transmission power, while a command to increase the transmission power is produced if the received power is less than the predetermined reference value. Thus, depending on the comparison result, the receiver transmits a digital or binary adjustment command to the transmitter. In this case, a command to increase the transmission power (power up command) is coded by a 1, while a command to reduce the transmission power (power down command) is coded by a zero. In each case, the adjustment command is transmitted to the transmitter after appropriate modulation. In accordance with the currently discussed WDCMA Standard for UMTS mobile radio systems, the transmission is carried out via QPSK modulation (Quadrature Phase Shift Keying), as a result of which the binary 1 or 0, respectively, is mapped onto the value −1 or +1, respectively, with subsequent spreading of the power control signal.

The power adjustment or power control information, thus, generally includes only one bit, which indicates whether the transmission power should be increased or decreased at the transmission end. In order to allow this bit to be transmitted with a sufficiently low error probability, the bit is transmitted repeatedly within the TPC field 6. The TPC information shown in FIG. 3, in consequence, includes, for example, the three bits which are transmitted successively with identical information content.

However, despite the repeated transmission of the TPC bits within the TPC field 6, the error rate is increased by the previously described slotted mode or compressed mode. In order to counteract this, information 6 is to be transmitted repeatedly, with this being done especially during the two timeslots 4 which immediately follow the idle slot 9.

Figure 1:
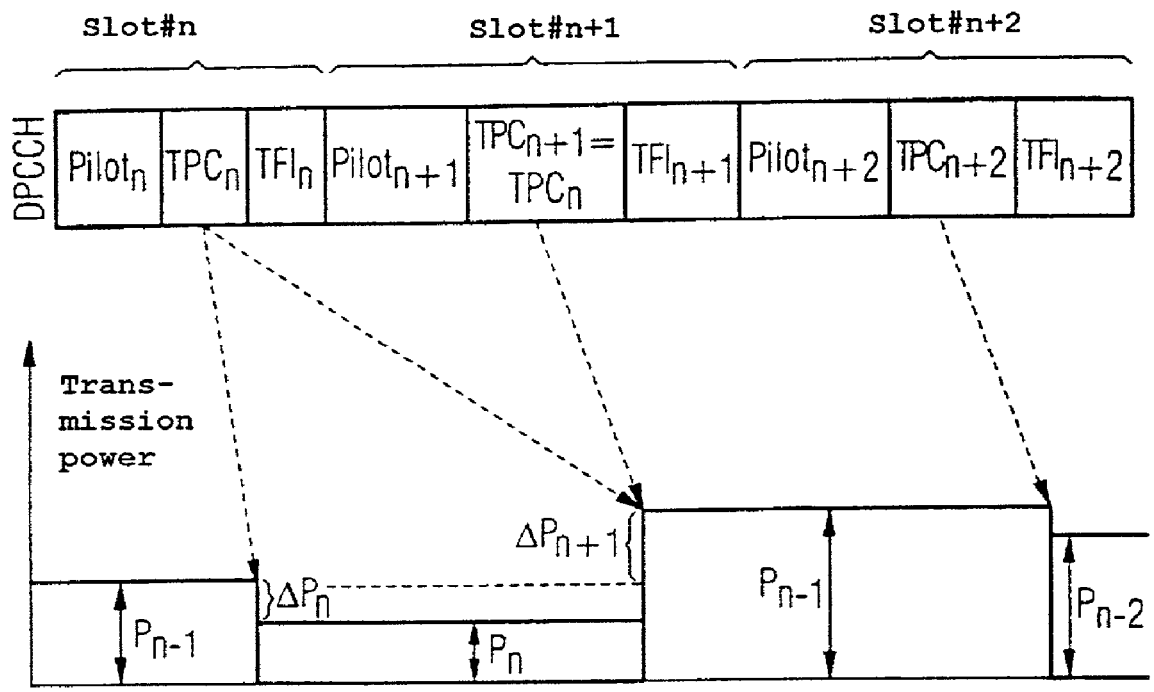
FIG. 1 shows an illustration to explain the principle on which the present invention is based, on the basis of a preferred exemplary embodiment.

In order to explain this principle, FIG. 1 shows, by way of example, the structure of the already previously mentioned DPCCH control channel (see FIG. 3) in a frame, assuming that the timeslots #n shown in FIG. 1, is the timeslot immediately following is an idle slot; that is to say, a section which is not filled with information. The profile of the transmission power, which is set in the transmitter as a function of the respectively transmitted TPC information, is shown underneath the timeslot structure.

In the receiver, the signal-to-noise ratio of the signal being received from the transmitter at that time is measured in order to determine the TPC or power adjustment information to be transmitted during the timeslot #n is compared with a reference value and is used to produce the TPC information $TPC_n$. This TPC information is transmitted to the transmitter during the timeslot #n where it is decoded and used to adjust the transmission power. In this case, it is possible to wait first of all in the transmitter for reception of the TPC information $TPC_{n+1}$ transmitted during the next timeslot #n+1, before finally setting the transmission power to the desired value, so that it is recommended that the transmission power initially be set in the transmitter in accordance with a "normal" nominal step width which corresponds to a normal $E_b/N_0$ ratio after receiving the TPC information $TPC_n$. This step width is indicated by $\Delta P_n$ in FIG. 1, and corresponds to the difference between the instantaneous transmission power $P_{n-1}$ and the transmission power $P_n$ set after reception of the TPC information $TPC_n$. The value 0 may also be chosen as the step width $\Delta P_n$ after reception of the power adjustment information $TPC_n$ in order to keep the transmission power constant until the power adjustment information $TPC_{n+1}$ is received, since it is then possible to make a decision on the transmission power to be set with greater reliability.

In order to produce the TPC information to be transmitted during the next timeslot #n+1, the TPC information from the previous timeslot is simply repeated, that is to say $TPC_{n+1}=TPC_n$, rather than evaluating the signal-to-noise ratio of the transmission signal once again. In this way, the ratio $E_b/N_0$ can be increased since, after receiving the timeslot #n+1, the TPC information $TPC_{n+1}$ can be combined with the already previously received TPC information $TPC_n$, and the transmitter is thus able to set the transmission power to the desired value with greater reliability. If, for example, the transmitter identifies the fact that the decision made as a consequence of the most recently received TPC information was incorrect, this can now be corrected. As shown in FIG. 1, the transmitter can now also change the transmission power with a larger step width, thus reducing the risk of a further deterioration being caused after an incorrect TPC decision. This is indicated in FIG. 1 by $\Delta P_{n+1}$, with both $\Delta P_n$ and $\Delta P_{n+1}$ indicating the step width with respect to the transmission power $P_{n-1}$ set after the idle slot.

The principle, mentioned above, of repeated transmission of the same TPC information during successive timeslots can be applied not only to the first time after an interruption in the power control by the idle slot, but also during a normal connection. In this case, this is of particular interest for those situations in which the transmission channel does not change so fast with time, since the disadvantage, associated with the method, of an increased delay in the power control can then be more than compensated for by the advantage of better quality of the transmitted power adjustment information. Since the smallest step width for power control is currently 1 dB and, for implementation reasons, smaller values are not suitable for use in mobile stations, this provides a possible way to reduce the power control rate.

Furthermore, the present invention can be used to transmit the power adjustment information with a smaller number of TPC bits. Although this reduces the bit-signal-noise ratio $(E_b/N_0)$, this can be compensated for by increased transmission reliability. The use of a small number of TPC bits is advantageous to the extent that this reduces what is referred to as the overhead, and the efficiency can thus be improved.

Furthermore, the present invention also can be used for what is referred to as a soft handover. In this case, the mobile station 2 transmits and receives data from and to a number of base stations 1. To detect the user data, the received signals from all the connections are combined, thus allowing the power of each individual connection to be reduced. The TPC power adjustment commands may, however, in general not be combined since the TPC power adjustment commands sent from different base stations 1 (via a downlink) need not be identical. Since the TPC power adjustment commands also must be evaluated very quickly, it is also generally impossible to combine them in the uplink. Otherwise, intolerable delays would occur caused by the corresponding information being passed on from one base station 1 to another base station 1. In addition to increasing the power level of the number of TPC bits, this could be overcome by use of the present invention.

Finally, the previously described invention can also be combined with the principle of analogue transmission of the step width for adjustment of the transmission power. In this case, the transmission power to be set in the transmitter and the corresponding step width are coded in analogue form rather than digitally. That is, the power adjustment information is in each case set in analogue form depending on the discrepancy between the measured received signal level and the predetermined reference value; for example, the pilot bit reception level. A discrepancy that is twice as great between the received signal level and the reference value thus results in a step width which is twice as large.

Although the present invention has been described with reference to specific embodiments, those of skill in the art will recognize that changes may be made thereto without departing from the spirit and scope of the invention as set forth in the hereafter appended claims.

The invention claimed is:

1. A method for controlling transmission power in a radio system, the method comprising the steps of:
   transmitting information, embedded in a frame and a time slot structure, between and transmitter and a receiver;
   evaluating a signal, which is received by the receiver from the transmitter via a transmission channel in the radio system;
   producing power adjustment information as a function of the evaluated signal in each time slot and sending the power adjustment information to the transmitter;
   adjusting the transmission power in the transmitter as a function of the power adjustment information; and
   transmitting identical power adjustment information from the receiver to the transmitter in a plurality of successive timeslots.

2. A method for controlling transmission power in a radio system as claimed in claim 1, wherein the information is transmitted in compressed form in a specific frame such that a section of the frame is not filled with information and, following the section which is not filled with information, the receiver transmits identical power adjustment information to the transmitter in a plurality of successive timeslots.

3. A method for controlling transmission power in a radio system as claimed in claim 2, wherein identical power adjustment information is transmitted to the transmitter in a plurality of successive timeslots which do not immediately follow the section which is not filled with information, and the transmission power in the transmitter is adjusted taking account of the power adjustment information received during the plurality of successive timeslots.

4. A method for controlling transmission power in a radio system as claimed in claim 2, wherein identical power adjustment information is transmitted to the transmitter a plurality of times in successive timeslots following the section which is not filled with information, with a plurality of repetitions being different each time.

5. A method for controlling transmission power in a radio system as claimed in claim 2, wherein, following the section which is not filled with information, the receiver transmits identical power adjustment information to the transmitter in two successive first and second timeslots.

6. A method for controlling transmission power in a radio system as claimed in claim 5, wherein the transmission power in the transmitter is adjusted as a function of both power adjustment information received in the first timeslot following the section which is not filled with information and power adjustment information received in a second section following the section which is not filled with information.

7. A method for controlling transmission power in a radio system as claimed in claim 5, wherein the signal received by the receiver from the transmitter is evaluated once again only after the transmission of the identical power adjustment information in the first and second time slots following the section which is not filled with information, and new power adjustment information is produced as a function of the re-evaluated signal and is sent to the transmitter in a next timeslot.

8. A method for controlling transmission power in a radio system as claimed in claim 5, wherein the transmission power in the transmitter is adjusted by a fixed amount after receiving the power adjustment information transmitted in the first timeslot following the section which is not filled with information, and after receiving the power adjustment information transmitted during the second timeslot following the section which is not filled with information, and taking account of the power adjustment information transmitted during the first time slot following the section which is not filled with information, a power change value is determined, and the transmission power in the transmitter is adjusted in accordance with the power change value relative to the transmission power set prior to the first adjustment.

9. A method for controlling transmission power in a radio system as claimed in claim 8, wherein the fixed amount corresponds to a value of zero.

10. A method for controlling transmission power in a radio system as claimed in claim 1, wherein, in the receiver, the power adjustment information is produced analogously as a function of a discrepancy between a specific evaluated parameter in the received signal and a corresponding reference value.

11. A method for controlling transmission power in a radio system as claimed in claim 1, wherein the method is used during a soft handover in the mobile radio system.

12. A radio system, comprising:
a transmitter; and
a receiver for receiving a signal, which is transmitted from the transmitter via a transmission channel in the radio system, and for evaluating the received signal in order to produce power adjustment information as a function of the received signal, and to send the power adjustment information to the transmitter;
wherein the transmitter adjusts the transmission power as a function of the power adjustment information received from the receiver, with information being transmitted, embedded in a frame and a timeslot structure, between the transmitter and the receiver with a signal, the receiver transmitting identical power adjustment information to the transmitter in a plurality of successive time slots.

13. A radio system as claimed in claim 12, wherein the information is transmitted in compressed form in a specific frame, such that there is a section of the frame which is not filled with information, the receiver transmitting identical power information to the transmitter in a plurality of successive time slots following the section which is not filled with information.

14. A radio system as claimed in claim 13, wherein the receiver also transmits identical power adjustment information to the transmitter in a plurality of successive timeslots which do not directly follow a section which is not filled with information, and the transmitter adjusts the transmission power taking account of the power adjustment information received during the plurality of successive timeslots.

15. A radio system as claimed in claimed 13, wherein the receiver transmits identical power adjustment information to the transmitter to the transmitter in two successive first and second timeslots following the section which is not filled with information.

16. A radio system as claimed in claim 15, wherein the transmitter adjusts the transmission power as a function of both power adjustment information received in the first time slot following the section which is not filled with information and power adjustment information received in a second section following the section which is not filled with information.

17. A radio system as claimed in claimed 15, wherein the receiver once again evaluates the signal, received by the receiver from the transmitter after the transmission of the identical power adjustment information in the first and second time slots following the section which is not filled with information, and produces new power adjustment information as a function of the re-evaluated signal, and sends the new power adjustment information to the transmitter in a next timeslot.

18. A radio system as claimed in claim 15, wherein the transmitter changes the transmission power by a fixed amount after receiving the power adjustment information transmitted in the first timeslot following the section which is not filled with information and, after receiving the power adjustment information received during the second timeslot following the section which is not filled with information and additionally taking account of the power adjustment information received during the first timeslot following the section which is not filled with information, determines a power change and changes the transmission power in the transmitter in accordance with the power change value.

19. A radio system as claimed in claim 18, wherein the fixed amount corresponds to a value of zero such that after receiving the power adjustment information transmitted in the first timeslot following the section which is not filled with information, the transmitter keeps the transmission power constant until reception of the power adjustment information transmitted in the second timeslot following the section which is not filled with information.

20. A radio system as claimed in claim 12, wherein the receiver produces the power adjustment information analogously as a function of a discrepancy between a specific evaluated parameter in the received signal and a corresponding reference value.

21. A radio system as claimed in claim 12, wherein the radio system is a CDMA mobile radio system.

* * * * *